United States Patent [19]

Hopkins

[11] Patent Number: 4,542,592
[45] Date of Patent: Sep. 24, 1985

[54] WHEELED VEHICLE LEVELING DEVICE AND METHOD

[75] Inventor: Ross E. Hopkins, Emporia, Kans.

[73] Assignee: Hopkins Manufacturing Corporation, Emporia, Kans.

[21] Appl. No.: 554,187

[22] Filed: Nov. 22, 1983

[51] Int. Cl.[4] .............................................. G01C 9/28
[52] U.S. Cl. ....................................... 33/386; 33/371; 33/383
[58] Field of Search ................. 33/386, 385, 383, 370, 33/371, 381, 384, 387, 351

[56] References Cited

U.S. PATENT DOCUMENTS

| 1,265,823 | 5/1918 | Skjonsbye | 33/387 |
|---|---|---|---|
| 1,829,257 | 10/1931 | Best et al. | 33/388 |
| 2,206,817 | 7/1940 | Mann | 33/386 |
| 2,232,567 | 2/1941 | Shroyer | 33/385 |
| 2,692,440 | 10/1954 | Walters | 33/383 |
| 2,706,341 | 4/1955 | Havens | 33/387 |
| 2,970,381 | 2/1961 | Pierce | 33/385 |
| 3,188,747 | 6/1965 | Race | 33/387 |
| 3,857,188 | 12/1974 | Foster et al. | 33/388 |

FOREIGN PATENT DOCUMENTS

| 22026 | 10/1947 | Finland | 33/383 |
|---|---|---|---|
| 136236 | 6/1952 | Sweden | 33/383 |
| 905216 | 9/1962 | United Kingdom | 33/388 |

*Primary Examiner*—Willis Little
*Attorney, Agent, or Firm*—Lahive & Cockfield

[57] ABSTRACT

A wheeled vehicle level has adjustable longitudinal and lateral level indicators, with the lateral level indicator further pivotable in response to a cam ring of a rotatable cap. The cap has numbers to indicate the amount by which a wheel should be raised to level the vehicle. Nestable wheel lifts accompany the level for raising the wheel. A method is shown for using the level in conjunction with the wheel lifts.

5 Claims, 10 Drawing Figures

WHEELED VEHICLE LEVELING DEVICE AND METHOD

BACKGROUND

This invention relates to leveling devices, and particularly to leveling devices for wheeled vehicles such as trailers and the like, and includes kits including the device and methods of leveling vehicles.

It is commonly necessary, when setting in place a camper or trailer or similar wheeled vehicle, to be sure that the vehicle is level. The usual procedure, for simpler vehicles, is to jack up the front of the vehicle at the trailer tongue or hitch until some longitudinal level indicating device shows the vehicle is level in that direction, and then insert spacers or lifts under a wheel of the vehicle to level it in the lateral direction, using a lateral level indicating device to check how level the vehicle is in the second direction.

There may be separate level indicating devices on the wheeled vehicle, or there may be a single, adjustable, level indicating device, including both longitudinal and lateral indicators, as shown, for example, in U.S. Pat. No. 2,970,381 to Pierce. Another U.S. Pat. No. 3,857,188, to Foster et al., shows a trailer leveling device in which a bubble level on a curved rail indicates the degree of lateral elevation required to bring the trailer to a level condition. In U.S. Pat. No. 2,706,341 to Havens, there is shown a list indicator for airplanes, in which a lateral bubble level is pivoted by a surface of a rotary cam, and an indicator dial shows the degree of list.

It is an object of this invention to provide a sturdy, inexpensive, level indicating device for wheeled vehicles that indicates longitudinal and lateral levels, that is adjustable for both those directions, and that also provides means for readily and rapidly indicating where and how much lift must be given a wheel to level the vehicle. It is a further object to provide a kit for leveling wheeled vehicles that includes a level indicating device and a number of wheel lifts that correspond to the device's indicators. Finally, it also is an object of the invention to provide a rapid and efficient method for leveling a wheeled vehicle in both the longitudinal and lateral directions.

SUMMARY OF THE INVENTION

A leveling device for wheeled vehicles, according to the invention, has a housing, a longitudinal level indicating means pivotally mounted in the housing, a first means for adjusting the longitudinal level indicating means, a lateral level indicating means pivotally mounted in the housing, a second means for adjusting the lateral level indicating means, the lateral level indicating means including a cam follower means, a cam ring means rotatably mounted on said housing, including a spiral cam surface, the cam follower means cooperating with the spiral cam surface to pivot the lateral level indicating means in response to rotation of the cam ring means, the cam ring means bearing circumferentially spaced indicating means, and pointer means fixed on the housing to cooperate with the indicating means to indicate the relative amount the lateral level indicating means has pivoted.

In a preferred embodiment, the lateral level indicating means includes means for holding a level indicating means, the holding means comprising a forwardly projecting cam follower means for cooperating with the cam ring spiral cam surface, a rearwardly projecting adjustment arm, an adjustable fulcrum means engaging the rearwardly projecting adjustment means, and biasing means located between the holding means and the housing, for biasing the adjustment arm against the fulcrum and biasing the cam follower means against the spiral cam surface.

The invention also includes a leveling kit for a wheeled vehicle, including a level indicating device comprising a longitudinal level indicating means mounted in the device, a lateral level indicating means pivotally mounted in the device, the lateral level indicating means including a cam follower means, a cam ring means rotatably mounted in the device and including a spiral cam surface, the cam follower means cooperating with the spiral cam surface to pivot the lateral level indicating means in response to rotation of the cam ring means, the cam ring means bearing circumferentially spaced indicating means, and pointer means fixed on the device to cooperate with the indicating means to indicate the relative amount the lateral level indicating means has pivoted, and a plurality of wheel lift means corresponding to the indicating means for insertion under a wheel of the wheeled vehicle to level the vehicle. In preferred embodiments the wheel lifts are nestable.

The method of the invention, for leveling a wheeled vehicle, comprises mounting on the wheeled vehicle a level indicating device having a longitudinal level indicating means, a lateral level indicating means pivotally mounted in the device and having a cam follower means, a cam ring means rotatably mounted in the device and including a spiral cam surface, the cam follower means cooperating with the spiral cam surface to pivot the lateral level indicating means in response to rotation of the cam ring means, the cam ring means bearing circumferentially spaced indicating means, and pointer means fixed on the device to cooperate with the indicating means to indicate the relative amount the lateral level indicating means has pivoted, and providing a plurality of wheel lift means corresponding to the indicating means for insertion under a wheel of the wheeled vehicle to level it. In a preferred embodiment, the method includes nesting the wheel lift means to level the vehicle.

BRIEF DESCRIPTION OF THE DRAWINGS

Other objects, features and advantages of the invention will be pointed out, or will be readily apparent from, the following description of a preferred embodiment of the invention, including the drawings thereof, in which.

DESCRIPTION OF A PREFERRED EMBODIMENT

Figures 1, 2, 3:
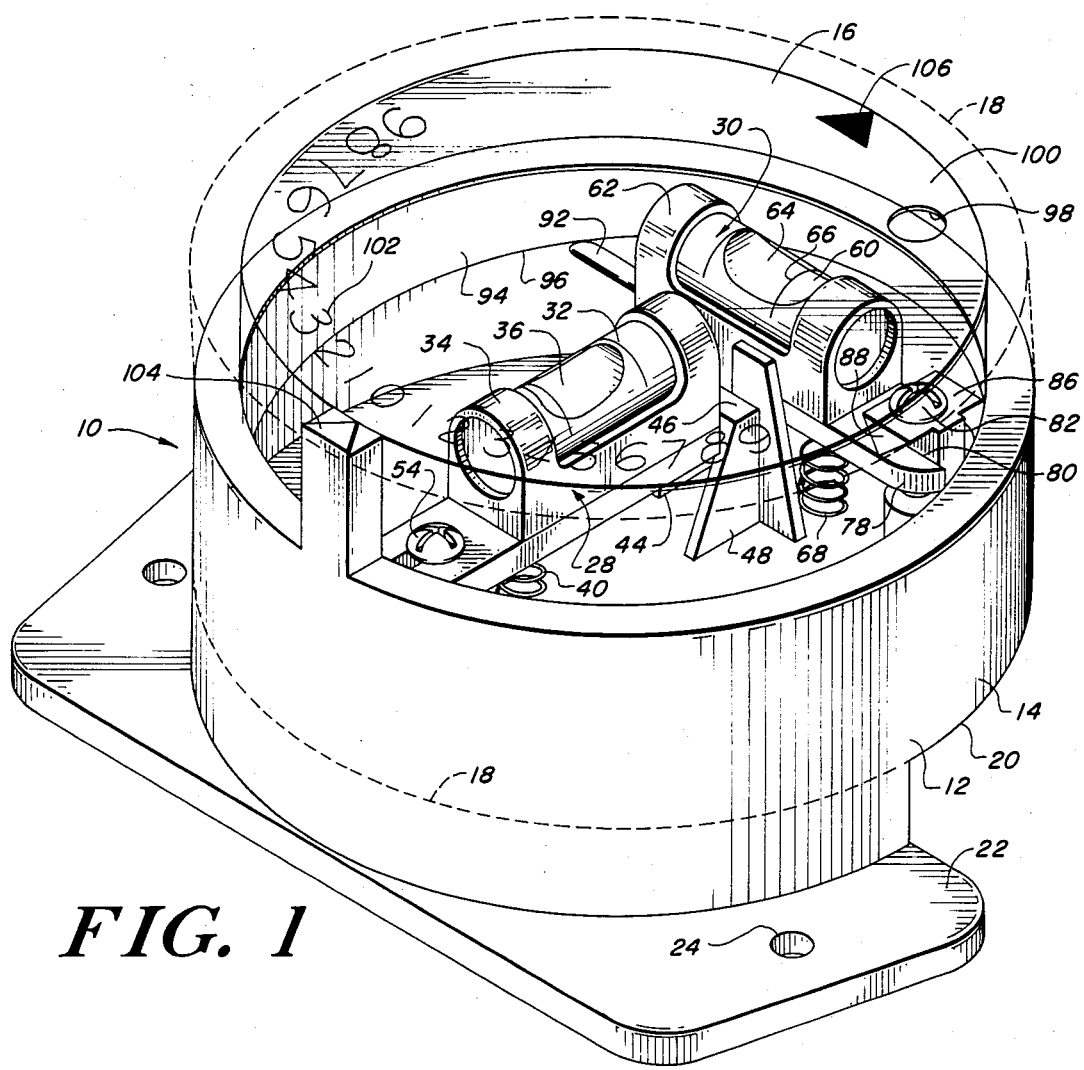
FIG. 1 is a perspective view of a level indicating device.
FIG. 2 is a side view of the device.
FIG. 3 is a sectional view of the edge of the device, showing the cam ring.

FIGS. 1 and 2 show a level indicating device 10 to be mounted on the frame of a wheeled vehicle such as a trailer (not shown), at a position where it can easily be seen while leveling the vehicle. Typically, this would be at the forward end of the vehicle, at the trailer tongue, or hitch, where the level indicator 10 could be seen when the vehicle is being jacked up to level it in the front-to-back, or longitudinal, direction.

The level indicator 10 includes a housing 12 having an opaque, rigid plastic, generally cylindrical base 14 and a clear plastic, also generally cylindrical, cap 16, mounted for rotation with respect to the base 14. The indicator 10 also includes a cover 16, to be dropped over the housing 12 to protect it from weather and dirt.

The housing base 14 has a bottom cut-away portion 20 to accommodate the trailer frame if necessary, and flat extensions 22 with screw holes 24 for mounting the housing 12 on the trailer frame. Alternatively, the flat extensions 22 may have two-sided adhesive strips for mounting the indicator 10 on the frame.

Within the level indicating device 10, mounted on a base plate 26 forming the bottom of the housing 12, are two level indicating assemblies: a longitudinal level indicating assembly 28 and a lateral level indicating assembly 30.

Figure 6:
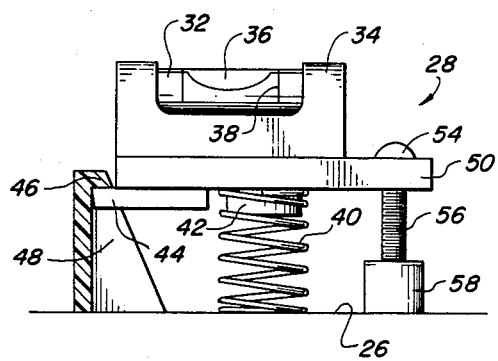
FIG. 6 is an elevation view of the longitudinal level indicator.
Figure 7:
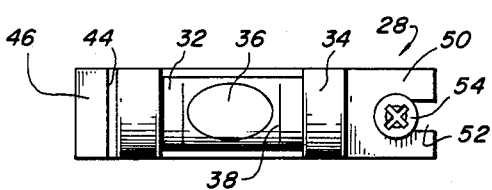
FIG. 7 is a plan view of the longitudinal level indicator.

The longitudinal level indicating assembly 28 (FIGS. 6 and 7) is oriented in the housing 12 so that when the device 10 is attached to the trailer, it is aligned with the longitudinal direction. The assembly 28 includes a bubble level vial 32 secured in a vial housing 34. The bubble level vial 32, in the conventional way, indicates a level position when a bubble 36 is located at the center of the vial 32, between two indicator marks 38.

The longitudinal level indicating assembly 28 is adjustable. The vial housing 34 is upwardly biased by a spring 40 extending from the base plate 26 of the housing 12 to a positioning stub 42 at the bottom of the housing 34. A forward projection 44 of the housing 34 is pivotally caught under a lip 46 of a frame 48 fixed to the base plate 26. A rearward projection 50 of the housing 34 has a slot 52 which is caught by the head 54 of the longitudinal adjusting screw 56. The longitudinal adjusting screw 56 engages a threaded base 58 mounted on the housing base plate 26.

Turning the longitudinal adjusting screw 56 will raise or lower the head 54, causing the longitudinal bubble level vial 32 to pivot in accord with the pivoting of the housing 34 about the lip 46 of the frame 48.

Figure 4:
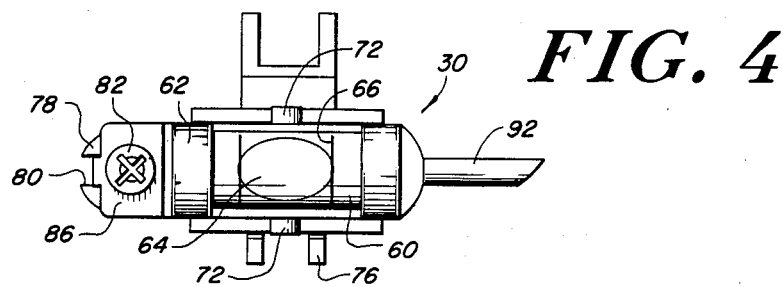
FIG. 4 is a plan view of the lateral level indicator of the device.

The lateral level indicating assembly 30 (FIGS. 4, 5A and 5B) is positioned in the housing 12 so that the lateral bubble level vial 60 is perpendicular to the longitudinal bubble level vial 32. The lateral bubble level vial 60 is secured in a housing 62, so that, like the other vial 32, a level position is indicated by a bubble 64 located between indicator marks 66.

The lateral level indicating assembly 30 is also adjustable. The vial housing 62 is upwardly biased by a spring 68 extending from the base plate 26 of the housing 12 to a positioning stub 70 at the bottom of the vial housing 62. The vial housing 62 has two laterally extending shafts 72 slidable in vertical slots 74 in frames 76 secured to the base plate 26.

The lateral vial housing 62 has a rearwardly projecting adjustment arm 78 with a slot 80 for the passage of a lateral adjusting screw 82. The adjusting screw 82 also passes through a slot 84 in an anti-torque boss 86 having a downwardly pointed, triangular portion 88 engaging the adjustment arm 78. The lateral adjusting screw 82 threadedly engages a threaded base 90 mounted on the housing base plate 26.

The lateral vial housing 62 has a forwardly projecting, rod-like cam follower 92 for cooperation with the rotatable housing cap 16.

Figure 5A:
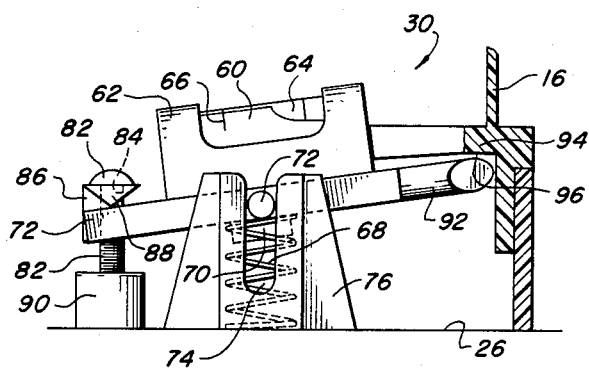
FIG. 5A is an elevation view of the lateral level indicator for one rotary position of the cam ring.
Figure 5B:
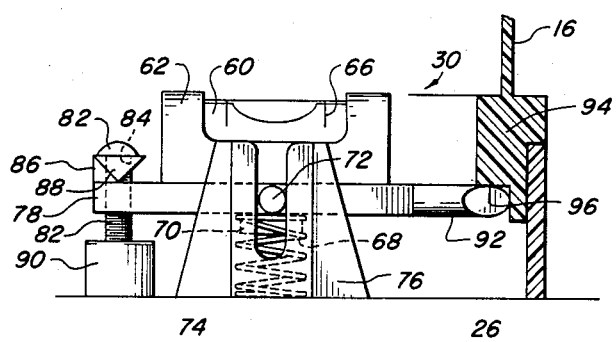
FIG. 5B is a similar elevation view for another position of the cam ring.

The rotatable housing cap 16 includes a cam ring 94 (FIG. 3) that has a cam surface 96 for cooperation with the cam follower 92. Cam surface 96 is a generally spiral like surface of the cam ring 94 whose effect on the cam follower 92 as the cap 16 is rotated is to move the cam follower 92 up or down, pivoting the lateral level vial 60. FIGS. 5A and 5B show different positions of the lateral level vial 60, depending on the rotary position of the cap 16. The upward bias of the spring 68 acts to bias the adjustment arm 78 of the lateral level vial assembly 30 against the fulcrum created by the anti-torque boss 86, and also to bias the cam follower 92 against the spiral cam surface 96.

The cap 16 has a hole 98 in its upper surface 100 through which a screw driver may be inserted for turning the adjusting screws 56,82. To adjust the level indicating device 10, the wheeled vehicle is first leveled by some third means, such as a carpenter's level, or by being brought to a known level surface. To adjust the longitudinal level vial 32, the cap 16 is turned until the hole 98 is over the longitudinal adjusting screw 56. The screw 56 is turned until the longitudinal bubble level vial 32 reads level. Then the cap 16 is turned until the hole 98 is over the lateral adjusting screw 82, and the lateral bubble level vial 60 is adjusted to read level.

The upper surface 100 of the cap 16 bears indicator marks, including a series of circumferentially spaced numbers 102 that are located so that when the adjusting hole 98 is over the lateral adjusting screw 82, the number "0" is adjacent a pointer 104 fixed to the housing base 16. A sequence of numbers in increasing order extends to each side from the "0." Furthermore, opposite the numeral "0," the cap upper surface 100 bears a pointer 106 pointing outwardly.

In operation of the level indicating device 10, the device 10 is first mounted on the wheeled vehicle. Then the longitudinal 32 and lateral 60 bubble level vials are adjusted as described above. If the vehicle is now brought to a strange surface it can be leveled.

The longitudinal level is achieved by jacking up the front of the wheeled vehicle until the longitudinal bubble level vial 32 reads level.

To level the vehicle in the lateral direction, one turns the cap 16 until the lateral bubble level vial 60 reads level. The rotational position of the cap 16 corresponds to the relative amount the vial 60 has pivoted under the influence of the cam follower 92. The pointer 106 on the cap 16 points to the side of the vehicle whose wheel needs to be raised to level the vehicle. The numbers 102 on the cap 16 are calibrated. They may be calibrated, as in the preferred embodiment, to read the inches that the wheel needs to be raised to achieve level. Such a calibration is only possible, of course, with a known wheel base. If the calibration is set for an average width between vehicle tires of 72 inches, however, the calibration will be practical for most vehicles.

Figure 9:
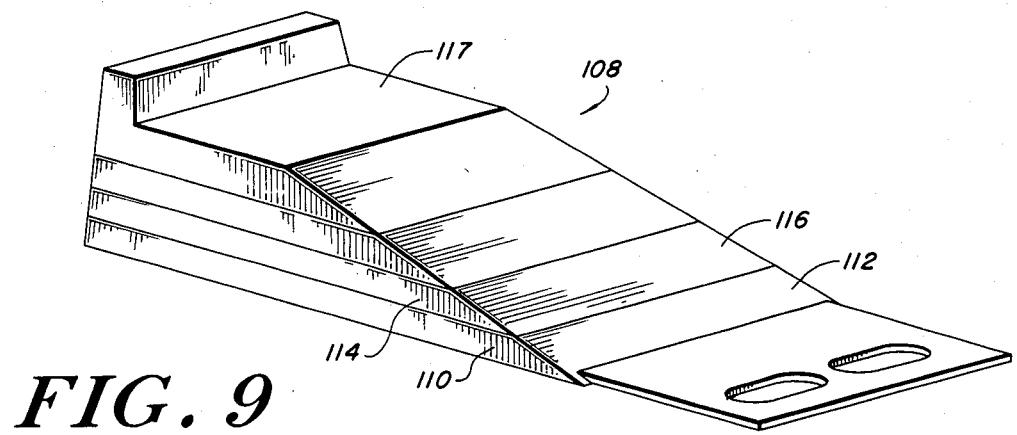
FIG. 9 shows the wheel lifts nested together.
Figure 8:
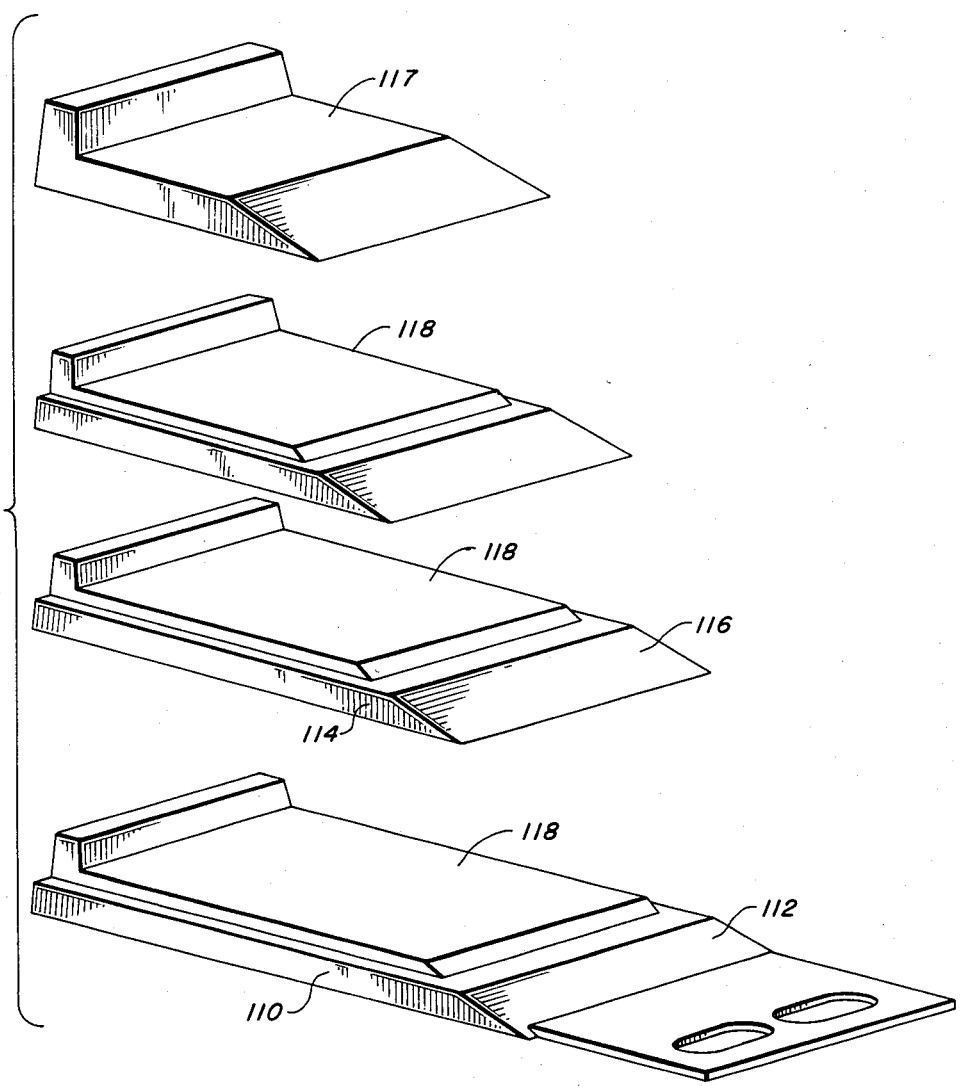
FIG. 8 shows a series of nestable wheel lifts for use with the level indicating device.

FIGS. 8 and 9 show a series 108 of nestable wheel lifts that may be used in a variety of combinations under a wheel of a vehicle to raise it the amount indicated by the level indicating device 10.

The series 108 includes a first, longest, lift 110, of a slab-like configuration with a beveled front edge 112. The second, shorter, lift 114 is similar, except that its beveled edge 116 lines up with the first lift's beveled edge 112. The lifts are nestable; that is, each except the top one 117 has a low raised central portion 118 corresponding to a recess (not shown) in the bottom of the lift to be placed atop it. Thus with the series of lifts 108 accompanying the level indicating device 10, one or more companion lifts can be nested together to be placed under a wheel of a wheeled vehicle to raise it the amount indicated by the device 10.

Modifications of, additions to, and subtractions from, the elements of the illustrative embodiment described herein may occur to those skilled in the art without departing from the spirit and scope of the invention, as set forth in the following claims.

I claim:

1. A wheeled vehicle leveling device, including
    a housing,
    a longitudinal level indicating means pivotally mounted in said housing,
        first means for adjusting said longitudinal level indicating means,
    a lateral level indicating means pivotally mounted in said housing,
        second means for adjusting said lateral level indicating means independently of said longitudinal level indicating means,
        said lateral level indicating means including a cam follower means,
    a cam ring means roatably mounted on said housing, including a spiral cam surface,
        said cam follower means cooperating with said spiral cam surface to pivot said lateral level indicating means independently of said longitudinal level indicating means in response to rotation of said cam ring means,
        said cam ring means bearing circumferentially spaced indicating means, and
    pointer means fixed on said housing to cooperate with said indicating means to indicate the relative amount said lateral level indicating means has pivoted
    said leteral level indicating means including means for holding a level indicating means,
        said holding means comprising
            a forwardly projecting cam follower means for cooperating with said cam ring spiral cam surface,
            a rearwardly projecting adjustment arm,
            an adjustable fulcrum means engaging said rearwardly projecting adjustment means, and
            biasing means located between said holding means and said housing for biasing said adjustment arm against said fulcrum and biasing said cam follower means against said spiral cam surface.

2. A wheeled vehicle leveling kit, including
    a level indicating device comprising
        a longitudinal level indicating means mounted in said device,
        a lateral level indicating means pivotally mounted in said device,
            said lateral level indicating means including a cam follower means,
        a cam ring means rotatably mounted in said device and including a spiral cam surface,
            said cam follower means cooperating with said spiral cam surface to pivot said lateral level indicating means in response to rotation of said cam ring means,
            said cam ring means bearing circumferentially spaced indicating means, and
        pointer means fixed on said device to cooperate with said indicating means to indicate the relative amount said lateral level indicating means has pivoted, and
    a plurality of wheel lift means corresponding to said indicating means for insertion under a wheel of said wheeled vehicle to level the vehicle.

3. The kit of claim 2 wherein said wheel lift means are nestable.

4. A method for leveling a wheeled vehicle comprising
    mounting on said wheeled vehicle a level indicating device having
        a longitudinal level indicating means,
        a lateral level indicating means pivotally mounted in said device and having a cam follower means,
        a cam ring means rotatably mounted in said device and including a spiral cam surface,
            said cam follower means cooperating with said spiral cam surface to pivot said lateral level indicating means in response to rotation of said cam ring means,
            said cam ring means bearing circumferentially spaced indicating means, and
        pointer means fixed on said device to cooperate with said indicating means to indicate the relative amount said lateral level indicating means has pivoted, and
    providing a plurality of wheel lift means corresponding to said indicating means for insertion under a wheel of said wheeled vehicle to level the vehicle.

5. The method of claim 4 including nesting said wheel lift means.

* * * * *